United States Patent [19]

Nimry et al.

[11] 4,384,071

[45] May 17, 1983

[54] FIBERS AND FILLED MOLDING COMPOSITIONS FROM COPOLYIMIDES AND POLYIMIDES DERIVED FROM TETRAMETHYLCYCLOBUTANE-1,2,3,4-TETRACARBOXYLIC DIANHYDRIDE AND DIAMINES

[75] Inventors: Tayseer S. Nimry, Wheaton; Ellis K. Fields, River Forest; Edward E. Paschke, Wheaton, all of Ill.

[73] Assignee: Standard Oil Company (Indiana), Chicago, Ill.

[21] Appl. No.: 286,695

[22] Filed: Jul. 24, 1981

[51] Int. Cl.$^3$ .............................................. C08L 79/08
[52] U.S. Cl. .................................. 524/600; 523/223; 524/492; 524/494
[58] Field of Search ............... 524/600, 602, 494, 495; 528/353

[56] References Cited

U.S. PATENT DOCUMENTS 4,014,832  3/1977  Suzuki et al. ..................... 524/600
4,183,835  1/1980  Yamaguchi et al. ............... 524/600

OTHER PUBLICATIONS

Nakanishi et al.; Polymers, 14, 440 (1973).

*Primary Examiner*—Lewis T. Jacobs
*Attorney, Agent, or Firm*—Gunar J. Blumberg; William T. McClain; William H. Magidson

[57] ABSTRACT

Novel glass and graphite filled copolyimides and polyimides useful as engineering plastics are prepared. Also fibers and oriented fibers from the copolyimides and polyimides derived from tetramethycyclobutane 1,2,3,4-tetracarboxylic dianhydride and diamines are disclosed.

38 Claims, No Drawings

FIBERS AND FILLED MOLDING COMPOSITIONS FROM COPOLYIMIDES AND POLYIMIDES DERIVED FROM TETRAMETHYLCYCLOBUTANE-1,2,3,4-TETRACARBOXYLIC DIANHYDRIDE AND DIAMINES

BACKGROUND OF THE INVENTION

1. Field of the Invention

The field of this invention relates to fibers and filled molding compositions from polyimides and copolyimides prepared from tetramethylcyclobutane-1,2,3,4-tetracarboxylic dianhydride (TMCDA) or a mixture of TMCDA and another dianhydride and diamines. These novel fibers and filled molding compositions are useful in fiber applications and as engineering plastics.

2. Background of the Invention

The process for the manufacture of polyimide and copolyimide from TMCDA is disclosed in companion applications filed the same day as the instant application and having Ser. No. 286,696, now U.S. Pat. No. 4,358,579, issued Nov. 9, 1982; Ser. No. 286,694, now U.S. Pat. No. 4,358,562, issued Nov. 9, 1982, and Ser. No. 286,697. All of these applications are incorporated herein by reference and made part of this application. As stated in the companion applications, it has been known to make polyimides from pyromellitic dianhydride and aromatic diamines. This is disclosed in U.S. Pat. No. 3,179,634 (1965). British Pat. No. 570,858 discloses various processes for making fiber forming polymers. The references listed below disclose the preparation of polyimides starting with cyclobutane-1,2,3,4-tetracarboxylic dianhydride. F. Nakanishi and M. Hasegawa, Polymers, 14, 440 (1973). Nos. JA7123917-S27, JA7137733-S44, JA137734-S44, JA7219710-T23 and JA7219908-T23. Another reference of interest is U.S. Pat. No. 3,852,248. In reviewing all these references it is clear that fibers and filled compositions from copolyimides and polyimides derived from TMCDA have not been contemplated in the prior art.

The general object of this invention is to provide fibers and oriented fibers and molding compositions reinforced with glass fibers, glass beads, minerals or a mixture thereof and graphite fibers wherein the polyimides and copolyimides are derived from TMCDA and diamines. We have now found that novel fibers and filled polyimides and copolyimide compositions can be obtained by reacting TMCDA or a mixture of TMCDA and other dianhydrides with diamines. These compositions can be filled with about 10 to 60 weight percent glass fibers, glass beads, minerals, or a mixture thereof or graphite fibers. Advantageously, the molding compositions may contain from 30 to 50 weight percent of glass fibers, glass beads, minerals or the mixture thereof or graphite fibers. Our studies have shown that the cost of the molding products derived from TMCDA may be reduced by substituting for part of the polymer up to 60 weight percent thereof with glass fibers, glass beads, minerals or graphite fibers. These glass filled polyimides and copolyimides are much more economical than molding compositions prepared without the use of the glass fibers, glass beads, minerals or graphite fillers. Novel fibers can also be prepared from the polyimides and copolyimides derived from TMCDA and this is indicated by the excellent physical properties of these copolyimides and polyimides. The copolyimides and polyimides based on TMCDA and diamines are suitably extruded at a temperature of about 270° to 350° C. through a fiber die having a multiplicity of holes of about 0.036 inch diameter each. Fiber strands are suitably taken up at 1–500 feet per minute, preferably at about 200–300 feet per minute. The fibers are suitably drawn at a temperature of at least 70° C. advantageously in the range of about 70° C. to 270° C., preferably in the temperature range of about 100° C. to 150° C. to give fibers having a tenacity of about 2.2 grams per denier and an initial modulus of about 28 grams per denier. The use of polyimides as engineering plastics has been limited only by the relatively high cost; thus, when the inherent cost can be brought down, the commercial application of polyimides can be greatly expanded.

Suitably, in our process for the manufacture of the novel copolyimides about equal molecular amounts of the TMCDA-aromatic or aliphatic dianhydride mixture are reacted with a primary diamine. The molar ratio of the TMCDA dianhydride mixture to the primary diamine may be in the range of 1.2:1 to 1:1.2, preferably in the range of 1 to 1. Advantageously, the reaction is carried out at a temperature of about 30° to 210° C. for a period of about 4 to 6 hours in a nitrogen containing organic polar solvent such as 1-methyl-2-pyrrolidinone (NMP), N,N dimethylacetamide or pyridine.

We have found that polyimides can be formed by reacting TMCDA with diamines. TMCDA reacts readily with the diamine to form a high molecular weight polyimide. In this process both aliphatic and aromatic diamines can be polymerized with TMCDA to form high molecular weight polyimides.

Our process for the manufacture of the polyimides comprises reacting about equal molar amounts of TMCDA with a primary diamine. The molar ratio of TMCDA to the primary diamine may be in the range of 1.2:1 to 1:1.2, preferably in the range of 1 to 1. In a suitable method, the reaction is conducted as a batch reaction at a temperature of about 30° to 300° C. for a period of about 2 to 24 hours in a nitrogen containing organic polar solvent such as 1-methyl-2-pyrrolidinone, N,N-dimethylacetamide, N,N-dimethylformamide or pyridine. The polycondensation can also be carried out as a continuous process. The polycondensation can suitably be carried out at a temperature of 30° C. to 300° C., preferably at a temperature of 100° C. to 200° C. The water by-product in these reactions may be distilled off at 100° to 150° C., removed by a stream of nitrogen or azeotroped with an organic solvent such as xylene. The polymerization reaction can also be carried out in the melt under an inert atmosphere or in vacuum.

The copolyimides have the following recurring structure, wherein R is a divalent aliphatic or aromatic hydrocarbon radical and R' is a tetravalent aliphatic or aromatic hydrocarbon radical.

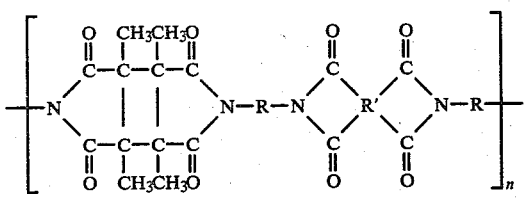

The radical R may be divalent aliphatic hydrocarbons of 2 to 18 carbon atoms or an aromatic hydrocarbon from 6 to 20 carbon atoms, or an aromatic hydrocarbon radical containing from 6 to 10 carbon atoms joined directly or by stable linkage comprising —O—,-methylene,

—SO—, SO₂—, and —S— radicals.

The preferred structures for R are the following: —(CH₂)₆—; —(CH₂)₁₂—;

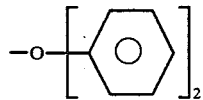

The preferred structures for R' are one of the following:

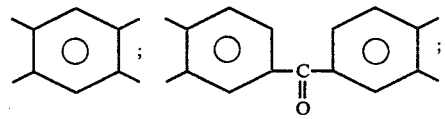

The radical R is derived from aliphatic, araliphatic or cycloaliphatic diamines such as ethylenediamine, propylenediamine, 2,2-dimethylpropylenediamine, tetramethylenediamine, hexamethylenediamine, octamethylenediamine, nonamethylenediamine, decamethylenediamine, dodecamethylenediamine, 4,4'-diaminodicyclohexylmethane, xylylene diamine and bis(aminomethyl) cyclohexane; suitable aromatic diamines useful in the process include para and meta-phenylenediamine, 4,4'-oxydianiline, thiobis (aniline), sulfonylbis (aniline), diaminobenzophenone, methylenebis (aniline), benzidine, 1,5-diaminonaphthalene, oxybis (2-methylaniline), thiobis (2-methylaniline), and the like. Examples of other useful aromatic primary diamines are set out in U.S. Pat. No. 3,494,890 (1970) and U.S. Pat. No. 4,016,140 (1972) both incorporated herein by reference. The preferred diamines are 4,4'-oxydianiline, 1,12-dodecanediamine, and 1,6-hexanediamine.

The dianhydrides are characterized by the following formula:

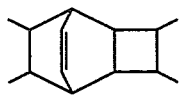

wherein R' is a tetravalent organic radical selected from the group consisting of aromatic, aliphatic, cycloaliphatic, heterocyclic, combination of aromatic and aliphatic, and substituted groups thereof. However, the preferred dianhydrides are those in which the R' groups have at least 6 carbon atoms characterized by benzenoid unsaturation, i.e. alternate double bonds in a ring structure, wherein the 4 carbonyl groups of the dianhydride are each attached to separate carbon atoms and wherein each pair of carbonyl groups is directly attached to adjacent carbon atoms in the R' group to provide a 5-membered ring as follows:

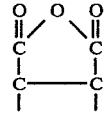

The preferred dianhydrides, as recited above, yield upon reaction with the diamines polyimide structures having outstanding physical properties. Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2-bis(3,4-dicarboxyphenyl) propane dianhydride; 3,4-dicarboxyphenyl sulfone dianhydride; 2,3,4,5-pyrrolidine tetracarboxylic dianhydride; 3,4,9,10-perylene tetracarboxylic dianhydride; bis(3,4-dicarboxyphenyl) ether dianhydride; ethylene tetracarboxylic dianhydride; 3,3',4,4'-benzophenone-tetracarboxylic dianhydride; bis(3,4-dicarboxyphenyl) sulfide dianhydride; bis(3,4-dicarboxyphenyl)methane dianhydride; 1,4,5,8-naphthalenetetracarboxylic dianhydride, tricyclo [4.2.2.0²,⁵] dec-7-ene-3,4,9,10-tetracarboxylic dianhydride, 3,6-etheno-hexahydropyromellitic dianhydride, cyclobutane-1,2,3,4-tetracarboxylic dianhydride, and 1,3-di-methylcyclobutane-1,2,3,4-tetracarboxylic dianhydride. The preferred dianhydride is tricyclo [4.2.2.0²,⁵] dec-7-ene-3,9,9,10-tetracarboxylic dianhydride.

The polyimides have the following recurring structure wherein R is a divalent aliphatic or aromatic hydrocarbon radical.

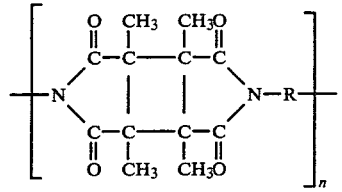

The radical R may be divalent aliphatic hydrocarbons of 2 to 18 carbon atoms or an aromatic hydrocarbon from 6 to 20 carbon atoms, or an aromatic hydrocarbon radical containing from 6 to 10 carbon atoms joined directly or by stable linkage comprising —O—, methylene,

—SO—, —SO₂—, and —S—radicals. The radical R is derived from aliphatic, araliphatic or cycloaliphatic diamines such as ethylenediamine, propylenediamine, 2,2-dimethylpropylenediamine, tetra-methylenediamine, hexamethylenediamine, octamethylenediamine, nonamethylenediamine, decamethylenediamine, dodecamethylenediamine, 4,4'-diaminodicyclohexylethane, xylylene diamine and bis(aminomethyl) cyclohexane. Suitable aromatic diamines useful in Applicant's process include para- and meta-phenylenediamine, 4,4'-oxydianiline, thiobis-(aniline), sulfonylbis-(aniline), diaminobenzophenone, methyllenebis-(aniline), benzidine, 1,5-diaminonaphthalene, oxybis-(2-methylaniline), thiobis-(2-methylaniline), and the like. Examples of other useful aromatic primary diamines are set out in U.S. Pat. No. 3,494,890 (1970) and U.S. Pat. No. 4,016,140 (1972) both incorporated herein by reference. The preferred diamines are 1,6-hexanediamine, 1,12 dodecanediamine and 4,4-oxybisanaline or 4,4'-oxydianiline.

In some cases the polyimide and copolyimide may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the polyimide and can be conducted in several ways. However all techniques require heating the ground or pelletized polyimide below the melting point of the polyimide, generally at a temperature of about 200° to 300° C. while either sparging with an inert gas such as nitrogen or operating under a vacuum. In cases where the polyimides have a low melt temperature, they can be polymerized in the melt under vacuum in thin sections or using thin film reactors known in the art.

Injection molding of the polyimides and copolyimides is accompanied by injecting the polyimides into a mold maintained at a temperature of about 50° C. to 150° C. In this process a 20 second to 1 minute cycle is used with a barrel temperature of about 200° C. to 350° C. These temperatures will vary depending on the Tg and Tm of the polymer being molded.

The polyimides and copolyimides have excellent mechanical and thermal properties and can readily be molded into useful articles or formed into fibers, films, laminates or coatings. The physical properties of the polyimide made with 1,12-dodecanediamine and the glass-reinforced polyimide are shown on Table 2. Infrared spectra of the polyimides has confirmed the polyimide structure.

Analysis of the TMCDA-diamine polyimide by thermal gravimetric analysis shows excellent stability. This is demonstrated by the fact that under nitrogen atmosphere 1% weight loss occurs at a temperature of 310° Centigrade and the main weight loss occurs at a temperature of about 400° Centigrade. Glass transition temperature Tg of the polyimide varied with the particular diamine used as shown in the Examples.

Diamines with the amino groups attached directly to the aromatic ring are suitably polymerized with TMCDA by solution condensation in organic polar solvents. Useful polar solvents include N,N-dimethylacetamide, 1-methyl-2-pyrrolidinone, N,N-dimethylformamide, pyridine, dimethylsulfoxide and the like.

We have found that the polyimides of this invention are improved by the addition of reinforcing material; particularly the mechanical properties of the polyimides are improved if these polyimides contain from about 25 to 60 percent by weight glass fibers, glass beads, minerals or graphite or mixtures thereof. In the preferred range the polyimides contain 30 to 40 percent by weight of the glass fibers, glass beads, or graphite or mixtures thereof. Suitably reinforcing materials can be glass fibers, glass beads, glass spheres, or glass fabrics. The glass fibers are made of alkali-free boron-silicate glass or alkali containing C-glass. The thickness of the fiber is suitably on the average between 3 mm and 30 mm. It is possible to use both long fibers with average lengths of from 5 to 50 mm and also short fibers of an average filament length from 0.05 to 5 mm. In principle, any standard commercial-grade fibers, especially glass fibers, may be used. Glass beads ranging from 5 mm to 50 mm in diameter may also be used as a reinforcing material.

The reinforced polyimide polymers may be prepared in various ways. For example, so-called rovings endless glass fiber strands are coated with the polyamic acid melt and subsequently granulated. The cut fibers or the glass beads may also be mixed with granulated polyamic acid and the resulting mixture melted in a conventional extruder, or alternatively the fibers may be directed, introduced into the polyamic acid melt through a suitable inlet in the extruder. Injection molding of the novel glass-filled polyimides and copolyimides is accomplished by injecting the polyimides into a mold maintained at a temperature of about 50° to 150° C. In this process a 20 second cycle is used with a barrel temperature of about 200° to 350° C. The injection molding conditions are given in Table 1.

TABLE I

| Mold Temperature | 50 to 150° C. |
|---|---|
| Injection Pressure | 15,000 to 19,000 psi and held for 1 to 3 seconds |
| Back Pressure | 100 to 220 psi |
| Cycle Time | 20 seconds |
| Extruder: | |
| Nozzle Temperature | 200 to 350° C. |
| Barrels: | |
| Front heated to | 200 to 350° C. |
| Screw: | |
| 20 to 25 revolutions/minute | |

The mechanical properties of the polyimide and copolyimide of the glass reinforced polyimides are given in Table 2, and show that these polyimides have excellent mechanical and thermal properties.

The following examples ilustrate the preferred embodiment of the invention. It will be understood that the examples are for illustrative purposes only and do not purport to be wholly definitive with respect to conditions or scope of the invention.

EXAMPLE 1

The reaction between TMCDA and 4,4-oxydianiline (ODA) was carried out under a nitrogen atmosphere and anhydrous conditions. The procedure involves the use of a three-neck flask containing a teflon-coated magnetic stirrer and fitted with a drying tube. The solid TMCDA, 3.15 g (0.0125 mole) was added to a solution of ODA, 2.50 g (0.0125 mole) in 40 ml NMP. The addition funnel was washed with 10 ml of NMP. The mixture was stirred at 80° C. for 1.5 hours. The temperature was increased to 180° C. when 15.5 ml of the solvent was distilled-off along with most of the water by-product. The mixture was then refluxed for 20 hrs. (oil bath temperature was 230° C.). The hot solution was mixed with water in a blender. The product was filtered, washed with hot water then dried in a vacuum oven at 120° C. for several hours. The yield was 93 mol %. The inherent viscosity of the polyimide, determined in a mixture of 60/40 phenol-tetrachloroethane (P/TCE) was 0.40. The general procedure for determining the inherent viscosity in this and all the other examples was to dissolve 0.1 g of the polyimide in 25 ml of P/TCE at 130° C., then cool the solution to 30° C., the temperature at which the IV measurements were made. (0.4 g/dl solvent at 30° C.) Analysis: Calcd. for polyimide: C, 69.23; H, 4.80; N, 6.73. Found: C, 68.84; H, 5.72; N, 6.55.

EXAMPLE 2

A solution of ODA, 1.25 g ($6.25 \times 10^{-3}$ mole) in 10 ml NMP was added dropwise to a solution of TMCDA, 1.58 g ($6.25 \times 10^{-3}$ mole) in 16 ml of NMP that was heated in an oil bath at 150° C. The temperature was increased to reflux and after 1 hr. 10 ml of NMP that contained most of the water by-product was distilled-off. The mixture was allowed to reflux for an additional 18 hr. The mixture was worked-up as in Example 1 above. Yield, 91 mol %. The inherent viscosity was determined in P/TCE to be 0.69. Analysis: Calcd. for polyimide: see Example 1. Found: C, 68.01; H, 4.91; N, 6.62.

EXAMPLE 3

The reaction between TMCDA and 1,6-hexanediamine was carried out under a nitrogen atmosphere and anhydrous conditions. The procedure involves the use of a three-neck flask containing a teflon-coated magnetic stirrer fitted with a drying tube. The diamine (0.025 mole) was added to the flask and dissolved with 60 ml of NMP and allowed to stir under a fast stream of nitrogen (dried over $H_2SO_4$) for 0.5 hr. The dianhydride TMCDA (0.025 mole) was then added to the flask through a dried powder funnel over 15-20 minutes. Residual dianhydride was then washed with enough solvent to make approximately 7-10% solution. Stirring was continued at a low temperature of about 40° C. until a clear solution containing the low-molecular-weight polyamic acid resulted. This was followed by heating at a higher temperature, about 135° C. for 4 hrs. The solution, which gels upon cooling, was mixed with water in a blender. The solid was filtered and washed with boiling water, then dried in a vacuum oven at 100° C. for several hours. The polyimide had an inherent viscosity of 0.55 determined in P/TCE. Elemental analysis of the polyimides was as follows:

|  | C | H | N |
|---|---|---|---|
| Calcd. | 65.06 | 7.23 | 8.43 |
| Found | 64.10 | 7.36 | 8.18 |

EXAMPLE 4

The procedure of Example 3 was repeated except that the polyamic acid was heated at a higher temperature of about 200° C. The inherent viscosity of the polyimide determined in P/TCE was 0.5.

EXAMPLE 5

The reaction between TMCDA and 1,12-dodecanediamine was carried out under a nitrogen atmosphere and anhydrous conditions. The procedure involves the use of a three-neck flask containing a teflon-coated magnetic stirrer fitted with a drying tube. The diamine (0.025 mole) was added to the flask and dissolved with 60 ml of NMP and allowed to stir under a fast stream of nitrogen (dried over $H_2SO_4$) for 0.5 hr. The dianhydride TMCDA (0.025 mole) was then added to the flask through a dried powder funnel over 15-20 minutes. Residual dianhydride was then washed with enough solvent to make approximately 7-10% solution. Stirring was continued at a low temperature of about 40° C. until a clear solution containing the low-molecular-weight polyamic acid resulted. This was followed by heating at a higher temperature of about 140° C. for 4 hrs. The solution, which gels upon cooling, is mixed with water in a blender. The solid is filtered and washed with boiling water, then dried in a vacuum oven at 100° C. for several hours. The polyimide had an inherent viscosity of 0.54 determined in P/TCE. Elemental analysis of the polyimide was as follows:

|  | C | H | N |
|---|---|---|---|
| Calcd. | 69.23 | 8.65 | 6.73 |
| Found | 68.80 | 8.59 | 6.52 |

EXAMPLE 6

The procedure of Example 5 was repeated except that the polyamic acid was heated at a higher temperature of about 200° C. and had an inherent viscosity of 0.65 determined in P/TCE.

EXAMPLE 7

A mixture of 30.27 g (0.12 mole) of TMCDA, 24.04 g (0.12 mole) of 1,12-dodecanediamine, 390 ml of NMP, and 60 ml of p-xylene was stirred at room temperature for fifteen minutes while blanketed with nitrogen. The mixture was refluxed for four hours with water being removed by use of a Dean-Stark trap. The solution was cooled and the polyimide was isolated by precipitation into water. The product was filtered, and dried at 200° C. and 1 nm Hg vacuum. Recovered product weighed 48.32 g (97% of theory) and had a 1.18 dl/g inherent viscosity (P/TCE).

TABLE 2

| Property | ASTM Method | TMCDA + 1,12 dodecane-diamine Polyimide (As Molded) | Polyimide 30% Glass |
|---|---|---|---|
| Heat Deflection Temp., °F. @ 264 psi | D-48 | 165 | 403 |
| Flexural Modulus, psi | D-790 | 188,000 | 1,120,000 |
| Flexural Strength, psi | D-638 | — | 27,000 |
| Yield Tensile Str., psi | D-638 | 4,300 | — |
| Elongation at Yield, % | D-638 | 4.2 | — |
| Ultimate Tensile Str., psi | D-308 | 5,400 | 17,800 |
| Elongation at Break, psi | D-630 | 305 | 4.5 |
| Tensile Impact Str., psi | D-638 | 192 | 72.5 |
| Izod Impact, Ft-lb/in | D-256 | 1.04(4) No Break (1) | 1.8 |
| % $H_2O$ Absorption at 100% RH | — | 0.8 | |

EXAMPLE 8

A polyimide was prepared according to the procedures of Example 7. 70 grams of the polyimide was dry blended with 30 grams of PPG3531 glass fiber. The product was then injection molded. The physical properties are shown in Table 2.

EXAMPLE 9

The polycondensation reaction was carried out under a nitrogen atmosphere and anhydrous conditions. ODA (0.0125 mole) was placed in a three-neck flask containing a teflon-coated magnetic stirrer; it was then dissolved in 30–50 ml of NMP. To the solution of ODA and 0.0125 mole of the equimolar mixture of tetramethylcyclobutane-1,2,3,4-tetracarboxylic dianhydride (TMCDA) and pyromellitic dianhydride (PMDA) were added through a dried powder funnel over a 10 minute period. The funnel was then washed with enough NMP to make approximately a 10% solution. The reaction vessel was heated in an oil bath to 190°–200° C. for 4 hours. The copolyimides were generally precipitated from solution by mixing with water in a blender, then dried in a vacuum oven at 100° C. for 10 hours. The yields were in excess of 80%, usually 95%. Elemental Analysis was the following:

|       | C     | H    | N    |
|-------|-------|------|------|
| Found | 68.36 | 4.79 | 7.02 |
| Calcd.| 69.17 | 3.76 | 7.02 |

EXAMPLE 10

The procedure of Example 1 was repeated except that the diamine used was hexamethylenediamine (HMDA). The inherent viscosity (I.V.) for this copolyimide was 0.55 determined in (P/TCE). A good film was cast by spreading the polyimide solution on a glass plate and drying at 120° C. for 1 hr. Elemental Analysis was the following:

|       | C     | H    | N    |
|-------|-------|------|------|
| Found | 64.59 | 6.59 | 8.90 |
| Calcd.| 66.06 | 5.81 | 8.56 |

EXAMPLE 11

The procedure of Example 1 was repeated except that the diamine used was 1,2-dodecanediamine (DDA). The I.V. for this copolyimide was 0.33 determined in P/TCE. Elemental Analysis was the following:

|       | C     | H    | N    |
|-------|-------|------|------|
| Found | 69.16 | 8.20 | 6.70 |
| Calcd.| 69.17 | 7.77 | 7.02 |

EXAMPLE 12

The polycondensation reaction was carried out under a nitrogen atmosphere and anhydrous conditions. ODA (0.0125 mole) was placed in a three-neck flask containing a teflon-coated magnetic stirrer and dissolved in 30–50 ml MNP. To this solution 0.0125 mole of an equimolar mixture of TMCDA and benzophenone tetracarboxylic dianhydride (BTDA) was added through a dried powder funnel over a 10-minute period. The funnel was then washed with enough NMP to make approximately at 10% solution. The reaction vessel was heated in an oil bath to 190°–200° C. for 4 hours. The copolyimides generally were precipitated from solution by mixing with water in a blender and then dried in a vacuum oven at 110° C. for 10 hours.

The I.V. for this copolyimide was 0.42 determined in P/TCE, and it formed a good film when its solution in NMP was cast on a glass plate and dried at 120° C. for 1 hr. Elemental Analysis was the following:

|       | C     | H    | N    |
|-------|-------|------|------|
| Found | 69.40 | 3.13 | 6.79 |
| Calcd.| 70.51 | 2.76 | 6.45 |

EXAMPLE 13

The procedure of Example 4 was repeated except that the diamine used was hexamethylenediamine (HMDA). The I.V. for this copolyimide was 0.37 determined in P/TCE and it cast a good film. Elemental Analysis was the following:

|       | C     | H    | N    |
|-------|-------|------|------|
| Found | 66.62 | 6.29 | 7.43 |
| Calcd.| 65.92 | 5.92 | 7.89 |

EXAMPLE 14

The procedure of Example 5 was repeated except that the I.V. for this copolyimide was determined in NMP. The I.V. of the copolyimide was 0.34. Elemental Analysis was the following:

|       | C     | H    | N    |
|-------|-------|------|------|
| Found | 67.14 | 6.43 | 7.42 |
| Calcd.| 65.92 | 5.92 | 7.89 |

EXAMPLE 15

The procedure of Example 4 was repeated except that the diamine used was DDA. The I.V. of this copolyimide was 0.26 determined in P/TCE. Elemental Analysis was the following:

|       | C     | H    | N    |
|-------|-------|------|------|
| Found | 71.19 | 8.39 | 6.10 |
| Calcd.| 69.70 | 7.52 | 6.38 |

EXAMPLE 16

The polycondensation reaction was carried out under a nitrogen atmosphere and anhydrous conditions. ODA (0.0125 mole) was placed in a three-neck flask containing a teflon-coated magnetic stirrer. It was then dissolved in 30 to 50 ml of NMP. To the diamine solution, 0.0125 mole of an equimolar mixture of TMCDA and the tricyclic tetracarboxylic dianhydride tricyclo [4.2.2.0$^{2,5}$] dec-7-ene-3,4,9,10-tetracarboxylic dianhydride, (TTDA) which is a 2:1 photo-adduct of maleic anhydride and benzene, was added through a dried powder funnel over a ten minute period. The funnel was then washed with enough NMP to make approximately a 10 percent solution. The reaction vessel was heated in an oil bath to 190°-200° C. for four hours. The copolyimide was precipitated from solution by mixing with water in a blender, and then dried in a vacuum oven at 110° C. for ten hours. The I.V. for this copolyimide was 1.14 determined in P/TCE and it cast a good film. Elemental Analysis was the following:

|  | C | H | N |
|---|---|---|---|
| Found | 68.20 | 4.00 | 6.77 |
| Calcd. | 70.26 | 4.45 | 6.56 |

EXAMPLE 17

The procedure of Example 8 was repeated except that the diamine was HMDA. The I.V. of this copolyimide was 0.77 determined in P/TCE and it cast a good film. Elemental Analysis was the following:

|  | C | H | N |
|---|---|---|---|
| Found | 66.38 | 6.87 | 8.28 |
| Calcd. | 67.60 | 6.45 | 7.89 |

EXAMPLE 18

The procedure of Example 8 was repeated except that the diamine used was DDA. The I.V. for this copolyimide was 0.24 determined in P/TCE and it cast a good film. Elemental Analysis was the following:

|  | C | H | N |
|---|---|---|---|
| Found | 69.45 | 9.84 | 6.54 |
| Calcd. | 70.26 | 8.20 | 6.56 |

EXAMPLE 19

The procedure of Example 2 was repeated except the molar ratio of TMCDA to PMDA was 1:3. The I.V. for this copolyimide was 0.75 determined in P/TCE. Elemental Analysis was the following:

|  | C | H | N |
|---|---|---|---|
| Found | 64.1 | 5.06 | 8.60 |
| Calcd. | 64.60 | 5.38 | 9.30 |

EXAMPLE 20

The procedure of Example 3 was repeated using the same dianhydride mixture of Example 11. The I.V. for this copolyimide was 1.0 determined in P/TCE. Elemental Analysis was the following:

|  | C | H | N |
|---|---|---|---|
| Found | 68.93 | 7.24 | 6.38 |
| Calcd. | 69.14 | 7.30 | 7.17 |

EXAMPLE 21

The procedure of Example 5 was repeated except the molar ratio of TMCDA to BTDA was 1:3. The I.V. for this copolyimide was 0.27 determined in P/TCE. Elemental Analysis was the following:

|  | C | H | N |
|---|---|---|---|
| Found | 66.06 | 5.02 | 7.29 |
| Calcd. | 67.88 | 5.07 | 7.28 |

EXAMPLE 22

The procedure of Example 7 was repeated using the dianhydride mixture of Example 13. The I.V. for this copolyimide was 0.36 determined in P/TCE. Elemental Analysis was the following:

|  | C | H | N |
|---|---|---|---|
| Found | 70.90 | 6.77 | 5.8 |
| Calcd. | 71.08 | 6.72 | 5.98 |

EXAMPLE 23

The procedure of Example 9 was repeated except the molar ratio of TMCDA to TTDA was 1:3. The I.V. of this copolyimide was 0.78 determined in P/TCE. Elemental Analysis was the following:

|  | C | H | N |
|---|---|---|---|
| Found | 66.21 | 6.55 | 8.27 |
| Calcd. | 67.14 | 6.46 | 8.03 |

EXAMPLE 24

The procedure of Example 10 was repeated using the dianhydride mixture of Example 15. The I.V. of this copolyimide was 0.61 determined in P/TCE. Elemental Analysis was the following:

|  | C | H | N |
|---|---|---|---|
| Found | 69.74 | 7.97 | 7.49 |
| Calcd. | 70.75 | 7.98 | 6.47 |

EXAMPLE 25

Table 3 hereinbelow lists the various properties for dianhydrides prepared according to the procedure set forth in Examples 1 through 16. The thermal properties were measured under $N_2$. Thermogravimetric Analysis (TGA) data were obtained on a Perkin-Elmer TGS-2 Thermogravimetric System using a heating rate of 20° C./min. The differential scanning colorimetry (DSC) measurements were made on a DuPont 990 DSC Thermal Analyzer using a heating rate of 20° C./min. and a cooling rate of 10° C./min.

TABLE 3

| Run # | Dianhydride | Mixture ratio | Diamine | TgA Wt. loss at T°, C. Onset | 1% | Tm, °C. 1st Heat | Tg, °C. |
|---|---|---|---|---|---|---|---|
| 1 | TMCDA + PMDA | (1:1) | HMDA | 400 | 435 | None | 137 |

TABLE 3-continued

| Run # | Dianhydride | Mixture ratio | Diamine | TgA Wt. loss at T°, C. Onset | 1% | Tm, °C. 1st Heat | Tg, °C. |
|---|---|---|---|---|---|---|---|
| 2 | TMCDA + PMDA | (1:3) | HMDA | 390 | 435 | None | 144 |
| 3 | TMCDA + PMDA | (1:1) | DDA | 325 | 425 | 219,237 | 61 |
| 4 | TMCDA + PMDA | (1:3) | DDA | 350 | 435 | 257,273 | 76 |
| 5 | TMCDA + BTDA | (1:1) | HMDA | 410 | 430 | None | 136 |
| 6 | TMCDA + BTDA | (1:3) | HMDA | 380 | 410 | 211 | 132 |
| 7 | TMCDA + BTDA | (1:3) | DDA | 375 | 410 | None | 72 |
| 8 | TMCDA + BTDA | (1:3) | DDA | 350 | 405 | None | 76 |
| 9 | TMCDA + TTDA | (1:1) | HMDA | 345 | 375 | None | 149 |
| 10 | TMCDA + TTDA | (1:3) | HMDA | 320 | 365 | 210 | 171 |
| 11 | TMCDA + TTDA | (1:1) | DDA | 320 | 365 | 179 | 83 |
| 12 | TMCDA + TTDA | (1:3) | DDA | 340 | 370 | 197 | 93 |

EXAMPLE 26

The 30% glass reinforced polyimide of Example 7 was heated at 200° C. for specified time periods. Physical properties shown in Table 4 were measured as a function of time. Essentially no change in properties was observed at 500 hours.

TABLE 4

| Property | Time (Hours) 0 | 100 | 500 |
|---|---|---|---|
| Flexural Modulus, psi | 1,120,000 | 1,100,000 | 1,320,000 |
| Flexural Strength, psi | 27,000 | 24,400 | 24,800 |

EXAMPLE 27

A polyimide based on TMCDA and 1,12-dodecanediamine prepared as shown in Example 7 having a 0.90 dl/g inherent viscosity was extruded at 270° C. through a fiber die having six holes of 0.036" diameter each. The fiber strands were taken up at 350 feet/minute. The fibers were drawn at temperatures of at least 70° C. to give fibers having a tenacity of 2.2 g/denier and an initial modulus of 28 g/denier.

EXAMPLE 28

Starting materials—The dianhydride, TMCDA, was prepared from maleic anhydride according to literature procedures. Treatment of maleic anhydride in boiling acetic acid and in the presence of 2-aminopyridine gives with decarboxylation 2,3-dimethylmaleic anhydride (M. E. Baumann and H. Bosshard, Helv. Chim. Acta, 16, 2751 (1978)). This compound is then converted to its dimer by irradiating its benzene solution sensitized by benzophenone with ultraviolet light for several hours. The resulting photodimer was recrystallized from acetic anhydride or a large volume of acetone. The literature procedure (G. D. Schenk, W. Hartmann, S. P. Mansfeld, W. Metzner, and C. H. Krauch, Chem. Ber., 95, 1642 (1962)) was improved considerably by us by using a weak UV source through Pyrex. This has the great advantage over Schenk et al, who used a medium-pressure mercury arc through quartz. Our improved method makes possible the manufacture of TMCDA by a continuous process of pumping a benzene solution of dimethylmaleic anhydride plus 1-7 wt% of benzophenone in benzene around Pyrex glass piping under irradiation by the sun, i.e., using cheap and inexhaustible solar radiation.

Fibers and filled molding compositions from copolyimides and polyimides are derived from tetramethycyclobutane-1,2,3,4-tetracarboxylic dianhydride and diamines.

We claim:

1. A copolyimide molding composition of the following recurring structure:

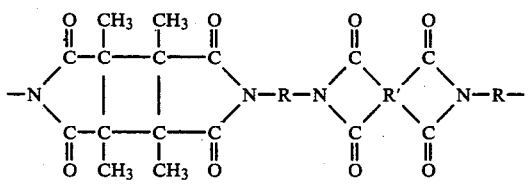

wherein R is a divalent aliphatic or aromatic hydrocarbon radical and R' is a tetravalent aliphatic or aromatic hydrocarbon radical and the molding composition contains about 30 to 50 weight percent of glass fibers, glass beads or graphite.

2. The molding composition of claim 1 wherein R and R' are aliphatic hydrocarbons from 2 to 18 carbon atoms.

3. The molding compositions of claim 1 wherein R and R' are aromatic hydrocarbons from 6 to 20 carbon atoms.

4. The copolyimide molding composition of claim 1 wherein the aromatic hydrocarbon radical contains from 6 to 10 carbon atoms joined directly or by stable linkage selected from the group consisting of —O— methylene,

—SO$_2$—, —SO— and —S— radicals.

5. A copolyimide molding composition of the following recurring structure:

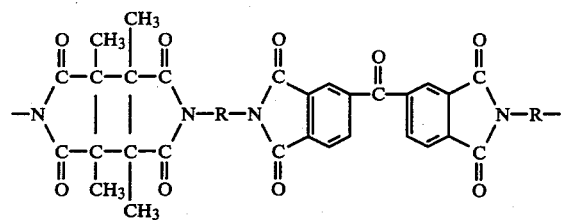

wherein R is a divalent aliphatic or aromatic hydrocarbon radical and the molding composition contains about 30 to 50 weight percent of glass fibers, glass beads or graphite.

6. The molding composition of claim 5 wherein R is an aliphatic hydrocarbon from 2 to 18 carbon atoms.

7. The molding composition of claim 5 wherein R is an aromatic hydrocarbon from 6 to 20 carbon atoms.

8. The copolyimide molding composition of claim 5 wherein the aromatic hydrocarbon radical contains from 6 to 10 carbon atoms joined directly or by stable linkage selected from the group consisting of —O—, methylene,

—SO$_2$—, —SO—, and —S— radicals.

9. A copolyimide molding composition of the following recurring structure

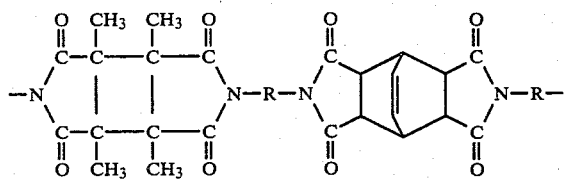

wherein R is a divalent aliphatic or aromatic hydrocarbon radical and the molding composition contains about 30 to 50 weight percent of glass fibers, glass beads or graphite.

10. The molding composition of claim 9 wherein R is an aliphatic hydrocarbon from 2 to 18 carbon atoms.

11. The molding composition of claim 9 wherein R is an aromatic hydrocarbon from 6 to 20 carbon atoms.

12. The copolyimide molding composition of claim 17 wherein the aromatic hydrocarbon radical contains from 6 to 10 carbon atoms joined directly or by stable linkage selected from the group consisting of —O—, methylene,

—SO$_2$—, —SO—, and —S— radicals.

13. A polyimide molding composition of the following recurring structure:

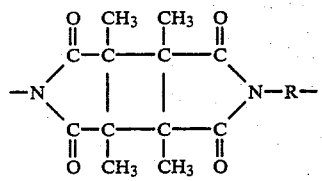

wherein R is a divalent aliphatic or aromatic hydrocarbon radical and the molding composition contains about 30 to 50 weight percent of glass fibers, glass beads or graphite.

14. The molding composition of claim 13 wherein R is an aliphatic hydrocarbon from 2 to 18 carbon atoms.

15. The molding composition of claim 13 wherein R is an aromatic hydrocarbon from 6 to 20 carbon atoms.

16. The molding composition of claim 13 wherein the aromatic hydrocarbon radical contains from 6 to 10 carbon atoms joined directly or by stable linkage selected from the group consisting of —O—, methylene,

—SO—, —SO$_2$—, and —S— radicals.

17. A polyimide molding composition of the following recurring structure:

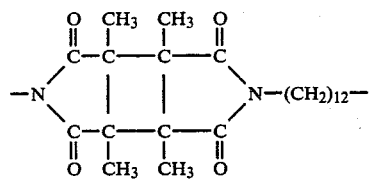

wherein the molding composition contains about 30 to 50 weight percent of glass fibers, glass beads or graphite.

18. A polyimide molding composition of the following recurring structure:

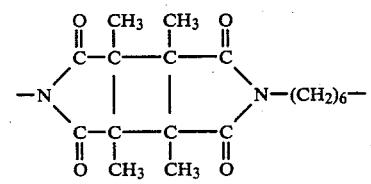

wherein the molding composition contains about 30 to 50 weight percent of glass fibers, glass beads or graphite.

19. A polyimide molding composition of the following recurring structure:

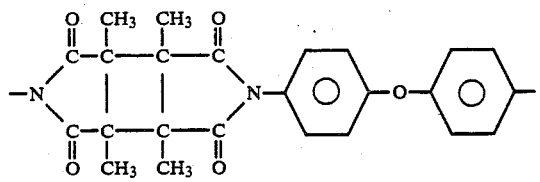

wherein the molding composition contains about 30 to 50 weight percent of glass fibers, glass beads or graphite.

20. A copolyimide molding composition of the following recurring structure:

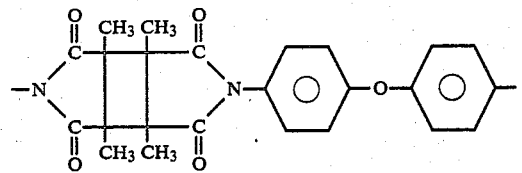
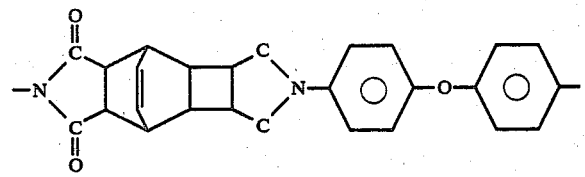

wherein the molding composition contains about 30 to 50 weight percent of glass fibers, glass beads or graphite.

21. A copolyimide molding composition of the following recurring structure:

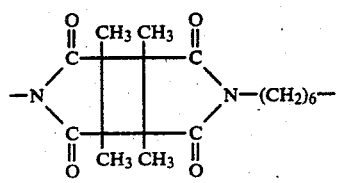

wherein the molding composition contains about 30 to 50 weight percent of glass fibers, glass beads or graphite.

22. A copolyimide molding composition of the following recurring structure:

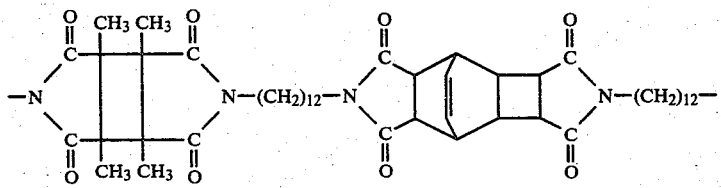

wherein the molding composition contains about 30 to 50 weight percent of glass fibers, glass beads or graphite.

23. A copolyimide molding composition of the following recurring structure:

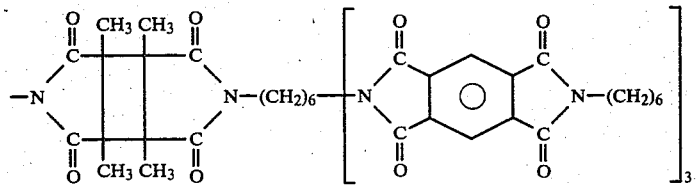

wherein the molding composition contains about 30 to 50 weight percent of glass fibers, glass beads or graphite.

24. A copolyimide molding composition of the following recurring structure:

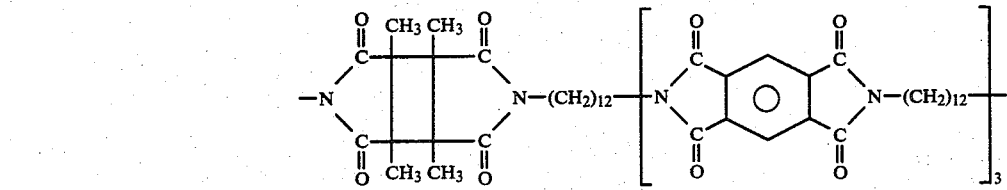

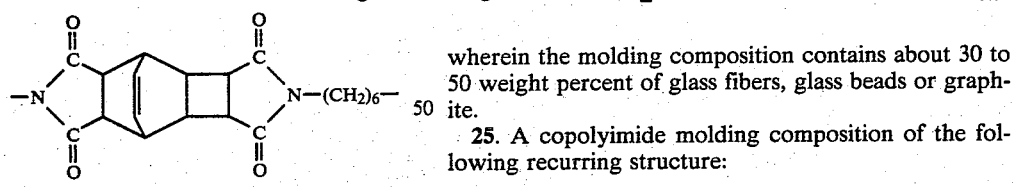

wherein the molding composition contains about 30 to 50 weight percent of glass fibers, glass beads or graphite.

25. A copolyimide molding composition of the following recurring structure:

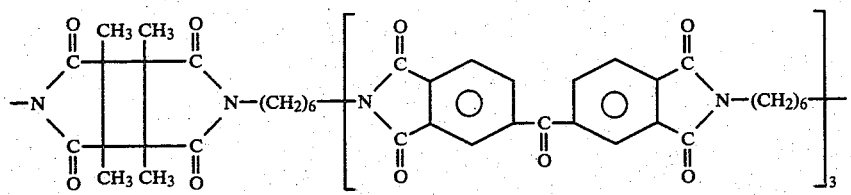

wherein the molding composition contains about 30 to 50 weight percent of glass fibers, glass beads or graphite.

26. A copolyimide molding composition of the following recurring structure:

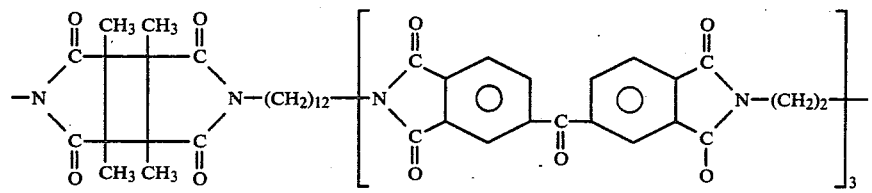

wherein the molding composition contains about 30 to 50 weight percent of glass fibers, glass beads or graphite.

27. A copolyimide molding composition of the following recurring structure:

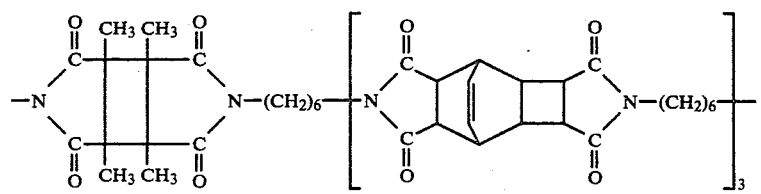

wherein the molding composition contains about 30 to 50 weight percent of glass fibers, glass beads or graphite.

28. A copolyimide molding composition of the following recurring structure:

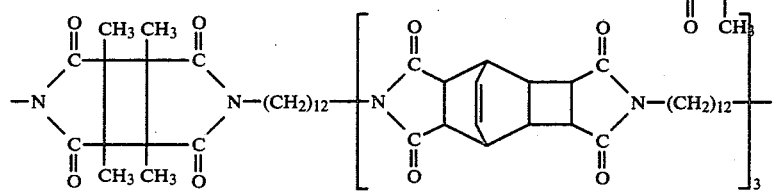

wherein the molding composition contains about 30 to 50 weight percent of glass fibers, glass beads or graphite.

29. A copolyimide molding composition of the following recurring structure:

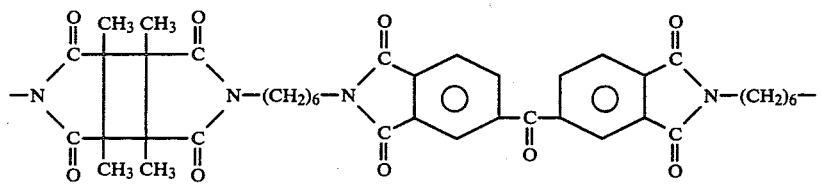

wherein the molding composition contains about 30 to 50 weight percent of glass fibers, glass beads or graphite.

30. A copolyimide molding composition of the following recurring structure:

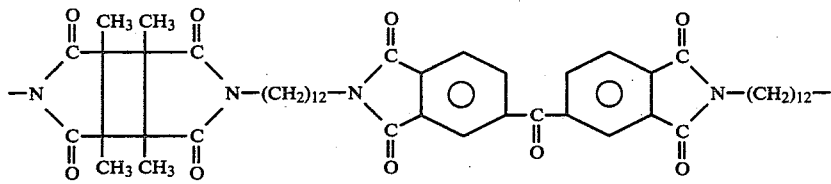

wherein the molding composition contains about 30 to 50 weight percent of glass fibers, glass beads or graphite.

31. A copolyimide molding composition of the following recurring structure:

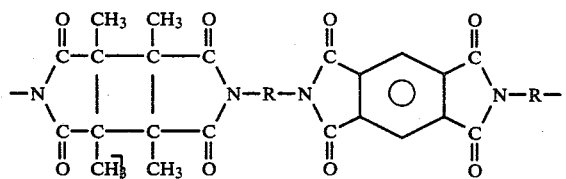

wherein R is a divalent aliphatic or aromatic hydrocarbon radical and the molding composition contains about 30 to 50 weight percent of glass fibers, glass beads or graphite.

32. The copolyimide of claim 31 wherein R is an aliphatic hydrocarbon from 2 to 18 carbon atoms.

33. The copolyimide of claim 31 wherein R is an aromatic hydrocarbon from 6 to 20 carbon atoms.

34. The copolyimide of claim 31 wherein the aromatic hydrocarbon radical contains from 6 to 10 carbon atoms joined directly or by stable linkage selected from the group consisting of —O—, methylene,

—SO—, —SO$_2$—, and —S— radicals.

35. The copolyimide molding composition of the following recurring structure:

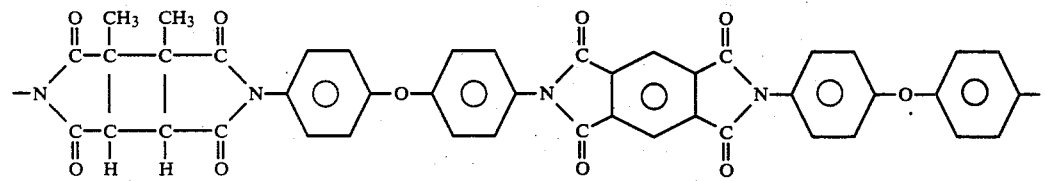

wherein the molding composition contains about 30 to 50 weight percent of glass fibers, glass beads or graphite.

36. A copolyimide molding composition of the following recurring structure:

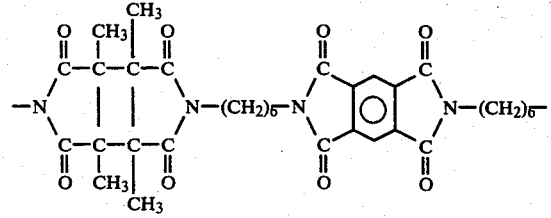

wherein the molding composition contains about 30 to 50 weight percent of glass fibers, glass beads or graphite.

37. A copolyimide molding composition of the following recurring structure:

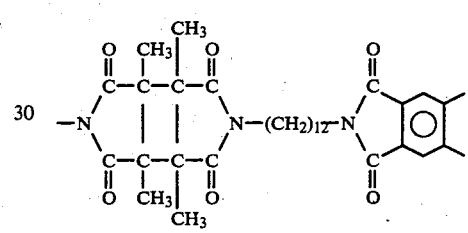

wherein the molding composition contains about 30 to 50 weight percent of glass fibers, glass beads or graphite.

38. A copolyimide molding composition of the following recurring structure:

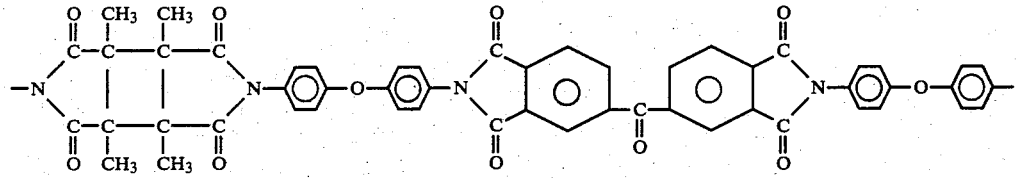

wherein the molding composition contains about 30 to 50 weight percent of glass fibers, glass beads or graphite.

* * * * *

UNITED STATES PATENT OFFICE
CERTIFICATE OF CORRECTION

Patent No. 4,384,071    Dated May 17, 1983

Inventor(s) Tayseer S. Nimry, Ellis K. Fields, Edward E. Paschke

It is certified that error appears in the above-identified patent and that said Letters Patent are hereby corrected as shown below:

| Column | Line | |
|---|---|---|
| 3 | 2 | " -O-, -" should read -- -O-, -- |
| 3 | 40 | "para-and meta-" should read --para- and meta- -- |
| 5 | 3 | "para-and meta-" should read --para- and meta- -- |
| 5 | 5 | "methyllenebis-" should read --methylenebis- -- |
| 6 | 45 | "ilustrate" should read --illustrate-- |
| 8 | 33 | "p-xylene" should read --p-xylene-- |

Signed and Sealed this

Twenty-first Day of February 1984

[SEAL]

Attest:

GERALD J. MOSSINGHOFF

Attesting Officer    Commissioner of Patents and Trademarks